(12) United States Patent
Harasawa et al.

(10) Patent No.: US 9,323,661 B2
(45) Date of Patent: Apr. 26, 2016

(54) MEMORY SYSTEM AND CONTROL METHOD THEREOF

(71) Applicant: Kabushiki Kaisha Toshiba, Tokyo (JP)

(72) Inventors: Akinori Harasawa, Tokyo (JP); Yoko Masuo, Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 220 days.

(21) Appl. No.: 13/779,458

(22) Filed: Feb. 27, 2013

(65) Prior Publication Data
US 2014/0019672 A1 Jan. 16, 2014

(30) Foreign Application Priority Data

Jul. 13, 2012 (JP) ................................ 2012-157985

(51) Int. Cl.
*G06F 12/02* (2006.01)

(52) U.S. Cl.
CPC .... *G06F 12/0246* (2013.01); *G06F 2212/7201* (2013.01)

(58) Field of Classification Search
CPC ............ G06F 11/1451; G06F 11/2064; G06F 11/2082; G06F 12/00; G06F 12/12; G06F 12/08; G06F 12/122; G06F 12/02; G06F 12/10; G06F 12/0238; G06F 17/30215; G06F 17/30578; G06F 2201/84
See application file for complete search history.

(56) References Cited

U.S. PATENT DOCUMENTS

| | | | |
|---|---|---|---|
| 8,527,733 B2 * | 9/2013 | Norimatsu et al. | 711/202 |
| 2006/0155922 A1 * | 7/2006 | Gorobets et al. | 711/103 |
| 2007/0124531 A1 * | 5/2007 | Nishihara | 711/3 |
| 2008/0098161 A1 * | 4/2008 | Ito | 711/103 |
| 2008/0120488 A1 * | 5/2008 | Woo et al. | 711/209 |
| 2009/0240871 A1 * | 9/2009 | Yano et al. | 711/103 |
| 2010/0037009 A1 * | 2/2010 | Yano et al. | 711/103 |
| 2010/0037011 A1 * | 2/2010 | Yano et al. | 711/103 |
| 2010/0037012 A1 * | 2/2010 | Yano et al. | 711/103 |
| 2010/0088557 A1 * | 4/2010 | Weingarten et al. | 714/704 |
| 2010/0138591 A1 * | 6/2010 | Yano et al. | 711/103 |
| 2010/0153626 A1 * | 6/2010 | Yano et al. | 711/103 |
| 2010/0161885 A1 * | 6/2010 | Kanno et al. | 711/103 |

(Continued)

FOREIGN PATENT DOCUMENTS

| | | |
|---|---|---|
| JP | 2008-112455 | 5/2008 |
| JP | 2010-102697 | 5/2010 |

(Continued)

OTHER PUBLICATIONS

Japanese Office Action dated Jun. 2, 2015 in counterpart Japanese Application 2012-157985.

*Primary Examiner* — Jared Rutz
*Assistant Examiner* — Jean Edouard
(74) *Attorney, Agent, or Firm* — Patterson & Sheridan, LLP

(57) ABSTRACT

A memory system has a storage unit having two or more parallel read/write processing elements and non-volatile data recording areas for a logical block divided into a plurality of logical pages, and a control unit that generates log information for each unit of data written into the recording areas, determines for each logical page a log information recording area from a group of recording areas of the logical page, and controls the parallel operation elements to write the log information generated for a logical page into the log information recording area of the logical page and the data of the logical page into the other recording areas of the group of recording areas of the logical page.

16 Claims, 13 Drawing Sheets

(56) References Cited

U.S. PATENT DOCUMENTS

| | | | |
|---|---|---|---|
| 2010/0169549 A1* | 7/2010 | Yano et al. | 711/103 |
| 2010/0169551 A1* | 7/2010 | Yano et al. | 711/103 |
| 2010/0169553 A1* | 7/2010 | Yano et al. | 711/103 |
| 2010/0169597 A1* | 7/2010 | Yonezawa et al. | 711/162 |
| 2010/0205353 A1* | 8/2010 | Miyamoto et al. | 711/103 |
| 2010/0274950 A1* | 10/2010 | Yano et al. | 711/103 |
| 2010/0318726 A1* | 12/2010 | Watanabe | 711/103 |
| 2011/0022784 A1* | 1/2011 | Yano et al. | 711/103 |

FOREIGN PATENT DOCUMENTS

| | | |
|---|---|---|
| JP | 2010-176702 | 8/2010 |
| JP | 2012-064158 A | 3/2012 |
| JP | 2012-068863 A | 4/2012 |

\* cited by examiner

Fig. 3A

DATA RECORDING SITE MANAGEMENT TABLE  1421

| LOGICAL CLUSTER ADDRESS | DATA RECORDING SITE (LOGICAL BLOCK NUMBER: LOGICAL CLUSTER NUMBER) |
|---|---|
| ⋮ | ⋮ |

Fig. 3B

LOGICAL TO PHYSICAL CONVERSION TABLE  1422

| LOGICAL BLOCK NUMBER | PHYSICAL BLOCK NUMBER | DELETION FREQUENCY |
|---|---|---|
| ⋮ | ⋮ | ⋮ |

BLOCK LIST FOR COMPACTION

| LOGICAL BLOCK NUMBER | NUMBER OF VALID CLUSTERS |
|---|---|
| ⋮ | ⋮ |

FREE BLOCK LIST

| LOGICAL BLOCK NUMBER |
|---|
| ⋮ |

FEW
↑
DELETION
FREQUENCY
↓
MANY

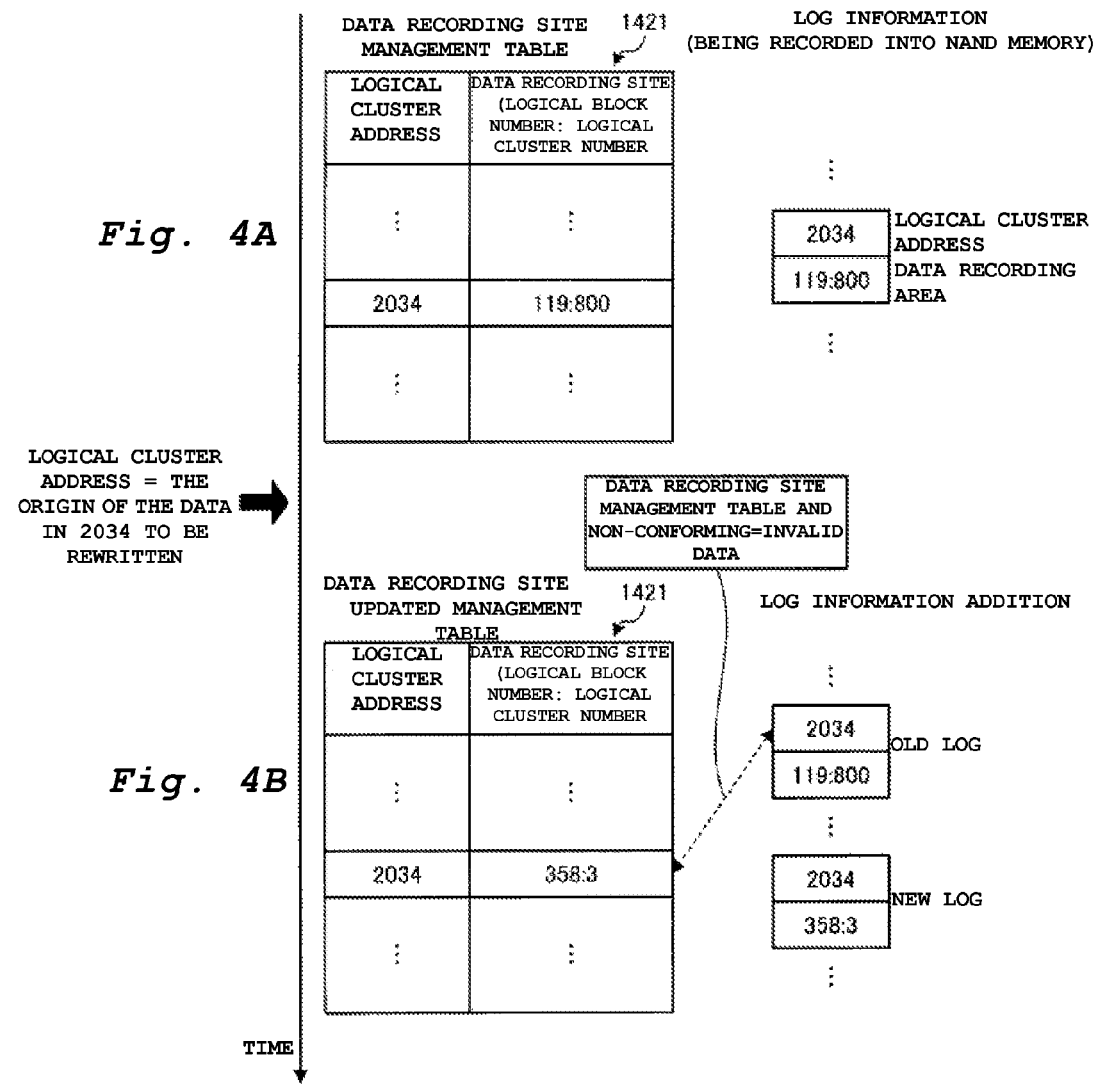

Fig. 5

WHEN BANK INTERLEAVE CANNOT BE USED

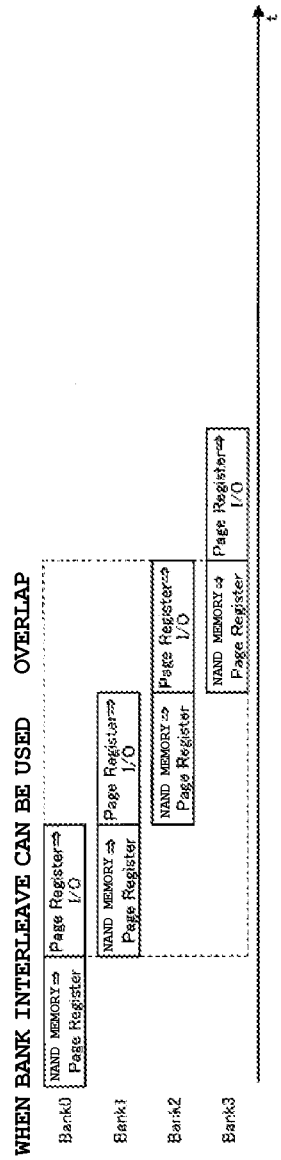

Fig. 7

MEMORY SYSTEM AND CONTROL METHOD THEREOF

CROSS-REFERENCE TO RELATED APPLICATION

This application is based upon and claims the benefit of priority from Japanese Patent Application No. 2012-157985, filed Jul. 13, 2012; the entire contents of which are incorporated herein by reference.

FIELD

Embodiments described herein relate generally to a memory system and its control method.

BACKGROUND

In a memory system using a nonvolatile memory, such as a NAND flash memory, a physical erase unit (hereafter referred to as the "erase block") is very large relative to the smallest unit of data that can be accessed from a host. Also, in response to a request to overwrite, physical data erasing is not performed and a writing control method which records new data in a different physical address area of the nonvolatile memory is adopted. If overwriting is repeated in this manner, the block containing invalid data will increase and the areas available for newly written data will decrease. Therefore, a compaction (garbage collection) processing is performed to free up areas available for new writes.

Generally, in a memory system, the locations of valid data are held in an effective data map, and this effective data map is searched for the valid data during the compaction processing. However, an exclusive memory area for holding this effective data map is required, and the size of this area increases in proportion to the capacity of the NAND flash memory installed in a memory system.

DESCRIPTION OF THE DRAWINGS

FIGS. 3A to 3D are diagrams schematically showing one example of management information.

FIGS. 4A and 4B are diagrams showing an example of data recording position management table and log information.

FIG. 5 is a diagram showing an example of distributing log information recording positions across different channels.

FIGS. 6A to 6C are diagrams for explaining a structure of bank interleaving.

FIG. 7 is a diagram showing an example of distributing log information recording positions across different channels and different banks.

DETAILED DESCRIPTION

Figure 1:
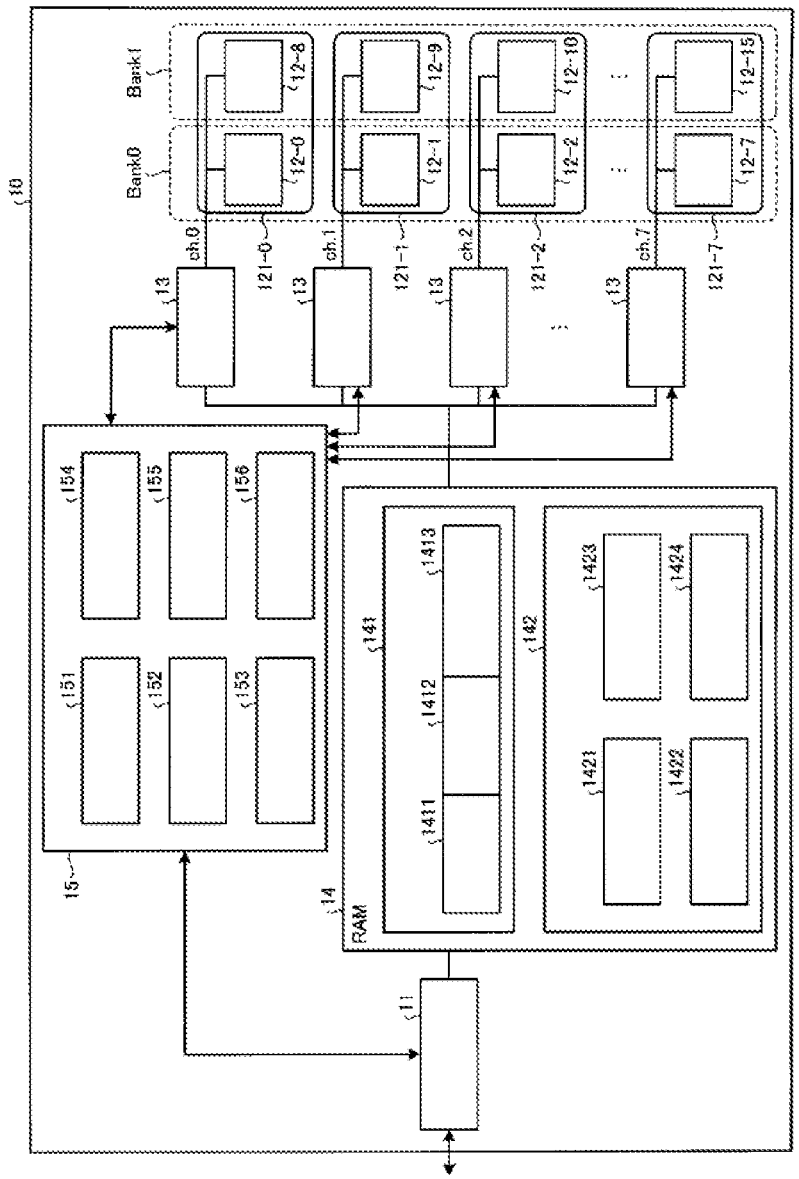
FIG. 1 is a block diagram schematically showing a configuration of a memory system according to an embodiment.

Embodiments provide a memory system and control method capable of searching for valid data for compaction without holding the effective data map.

In general, a memory system and its control method according to embodiments are explained in detail below. The embodiments do not limit the scope of the present disclosure.

According to one embodiment, a memory system includes a first storage unit, a second storage unit, and a control unit. The first storage unit is non-volatile, and a storage area in the first storage unit includes two or more parallel operation elements. Position management of recorded data is performed by a data management unit, and an access area of a size of an access unit of natural multiple of the data management unit has a plurality of data blocks including a predetermined number of the data recording areas prepared for each parallel operation element. The second storage unit of the above temporarily stores the data exchanged between a host device and the first storage unit of the above, or the data moved within the first storage unit of the above. The control unit performs data transfer between the first storage unit and the second storage unit mentioned above. The second storage unit stores data recording position management information in which an address assigned for the data stored by the first storage unit is matched with the data recording position specified in the data block within the first storage unit. The control unit is equipped with a log information generation unit, a log information record positioning unit, a data-processing unit, and a determination unit. The log information generation unit generates the log information in which the data recording position where the data is written is associated with its address for every data management unit of the data recording area of a writing destination, before writing data in the first storage unit. Before writing the data in the first storage unit, the log information record positioning unit determines the start position of the data so that writing of the log information may be distributed between the parallel operation elements within the data block. The data-processing unit performs the writing processing using the parallel operation elements to write the data and the log information in the data recording area, and the reading processing which reads data from the first storage unit into the second storage unit. When the determination unit of data for compaction performs the compaction processing, it acquires the record position of the valid data in the data block using the log information of all the data recording areas in the data block for compaction, and the data recording position management information. The data-processing unit reads the valid data to the second storage unit using the recording position of the valid data acquired from the determination unit of data for compaction at the time of the compaction processing, and the valid data is written in the data recording area to write together with the log information generated by the log information generation unit.

FIG. 1 is a block diagram schematically showing a configuration of a memory system according to one embodiment. A memory system 10 in FIG. 1 is an SSD (Solid State Drive) which is equipped with a nonvolatile memory as an external storage used for computer systems. Below, the case where a NAND flash memory is used as a nonvolatile memory is described as an example.

The memory system 10 is equipped with a host interface unit 11 and a NAND flash memory (henceforth a NAND memory) 12-0 to 12-15 (in addition, below) which is the first storage unit (note that if there is no particular need to distinguish the 12-0 to 12-15 NAND memory, respectively, it is referred to as a NAND memory 12 in the following), NAND controller (channel control unit) 13, RAM (Random Access Memory) 14 which is the second storage unit, and a control unit 15.

A host interface unit 11 is a memory connection interface, such as an ATA (Advanced Technology Attachment) interface, and provides an interface to a host device such as personal computer or a CPU (Central Processing Unit) core which is not shown.

The NAND memory 12 is a memory storage which can store data in a non-volatile manner, and is used as a storage unit for storage of the management information etc. which manage the storing position (recording position) of user data or the data within a program. More specifically, the data specified by the host device, or important data to be stored in non-volatile manner, such as management information, a firmware program, etc. which manage the data recording position in the NAND memory 12, are stored.

Here, eight parallel operations elements 121-0 to 121-7 perform 8 parallel operation, and the eight parallel operation elements 121-0 to 121-7 are connected to eight NAND controllers 13 by eight channels (ch0 to ch7), respectively. Each parallel operation element 121-0 to 121-7 is constituted by two or more banks (here two banks Bank0, Bank1) in which bank interleaving is possible. In this example, the parallel operation element 121-0 is constituted by the NAND memory 12-0 and 12-8, the parallel operation element 121-1 is constituted by the NAND memory 12-1 and 12-9, etc., and the parallel operation element 121-7 is constituted by the NAND memory 12-7 and 12-15.

Although each NAND memory 12-0 to 12-15 may correspond to each NAND memory chip, respectively, one NAND memory chip may include any NAND memory 12-0 to 12-15, for example, NAND memory 12-0, and the NAND memory 12-8 which belongs to the adjoining bank connected to the same channel. Moreover, although the case where the number of channels is 8 and the number of banks for every channel is 2 is illustrated above, the number of channels and the number of banks are not limited to this. Thus, parallel operation by the bank interleaving operation by the parallel operation by multiple channels and multiple banks is possible for each NAND memory 12-0 to 12-15.

Figure 2:
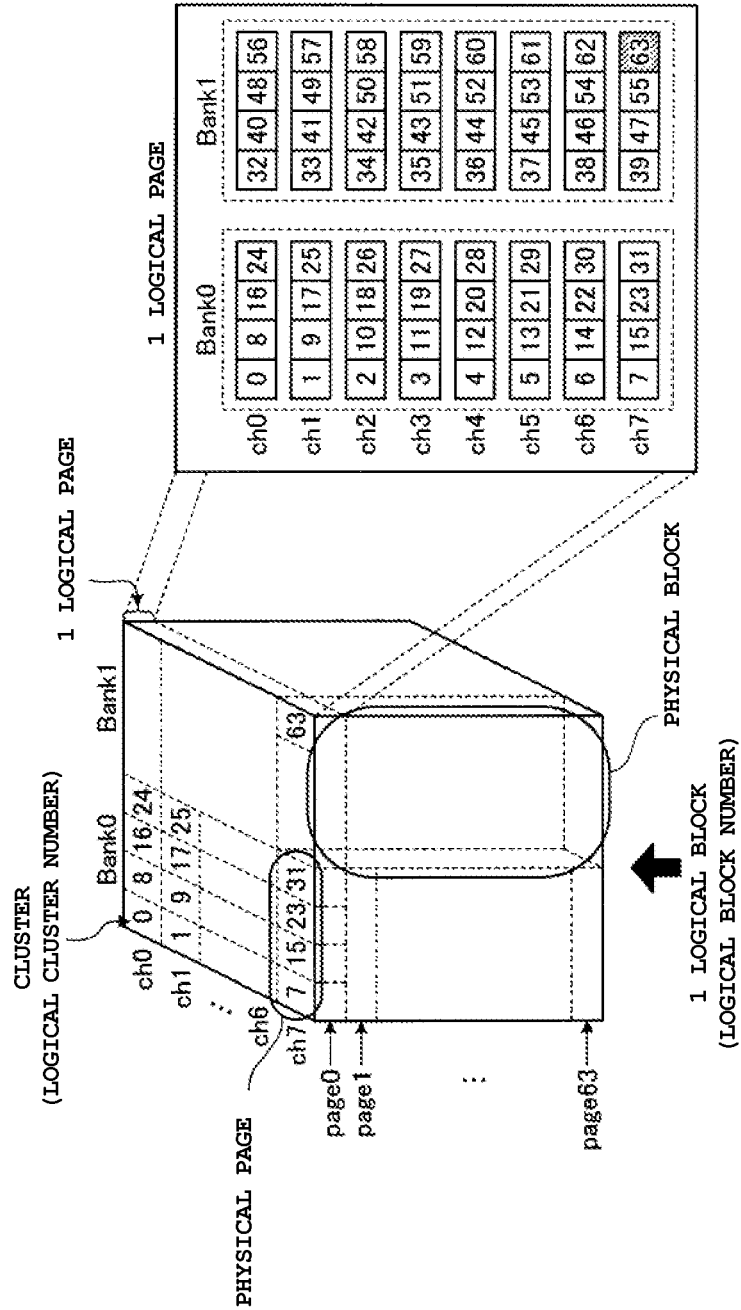
FIG. 2 is a diagram schematically showing a data management unit in a NAND memory of the embodiment.

FIG. 2 is a diagram schematically showing a data management unit in the NAND memory in this embodiment. Inside the chip which constitutes the NAND memory 12, the unit of write and read accesses is a logical page which includes two or more physical pages, and the smallest erasable access unit is an independent physical block. Moreover, in this example, as described above, since parallel operation by bank interleaving is possible while performing 8 parallel operations, one logical page used as a data recording area includes 16 physical pages in which write/read is possible in parallel, and one logical block is a data block containing 16 physical blocks that are erasable in parallel.

The data within the NAND memory 12 is managed (recorded) in units of a cluster which is a data management unit smaller than one physical page. A cluster size is greater than the size of a sector which is the smallest access unit from the host device. A natural multiple of the cluster size is determined so as to become the physical page size. Specifically, in the example explained below, one physical page includes four clusters, and one logical page includes 64 clusters. In addition, in order to write data in parallel in each channel, in this embodiment, data will be stored in the direction across a channel (parallel operation element 121-0 to 121-7).

The NAND controller 13 performs an interface processing with the NAND memory 12. Although details are omitted, error correction, an access control between the NAND memory 12 and the RAM 14, etc. are processed here.

The RAM 14 includes a data buffer area 141 which functions as a buffer for data transfer between the host device and the NAND memory 12, and a management information storage area 142 which stores the management information which manages the recording position of the data within the NAND memory 12. The data buffer area 141 includes a reading buffer 1411 which temporarily stores the data read from the NAND memory 12 at the time of the reading request from the host device, a writing buffer 1412 which temporarily stores data written in the NAND memory 12 at the time of the writing request from the host device, and a compaction buffer 1413 which stores temporarily the data read from the NAND memory 12 on the occasion of a compaction processing.

In addition to the RAM 14, a DRAM (Dynamic RAM), SRAM (Static RAM), FeRAM (Ferroelectric RAM), MRAM (Magnetoresistive RAM), PRAM (Phase change RAM), etc. may be used.

As described above, the management information storage area 142 stores the management information which includes a data recording position management table 1421, a logical address—physical address translation table (hereinafter referred to as logical-physical translation table) 1422, a block list 1423 for compaction, and a free block list 1424.

FIGS. 3A to 3D are figures schematically showing an example of management information. FIG. 3A is a figure showing an example of a data recording position management table. FIG. 3B is a figure showing an example of a logical-physical translation table. FIG. 3C is a figure showing an example of the block list for compaction. FIG. 3D is a figure showing an example of a free block list. In the NAND memory 12, the recorded position of data per cluster is managed and the data recording position management table 1421, as shown in FIG. 3A, includes the management information which matches the logical address (henceforth a logic cluster address) for the data of a cluster unit, with the data recording position where the data is stored. A logic cluster address is an address assigned to data within the NAND memory 12. Moreover, the data recording position includes the combination of a logical block number which shows the logical block in which the data is stored and a logic cluster number which shows the cluster in which the data within the logical block number is stored. That is, the data recording position is uniquely determined by the combination of the logical block number and the logic cluster number. Here, the data recording position is written as the "logical block number: logic cluster number." In addition, in one logical block, from the cluster of the first logical page to the cluster of the last logical page, the logic cluster number is numbered in order, as shown in FIG. 2.

The logical-physical translation table 1422 includes the logical block number, the physical block number which shows the physical block to which the logical block number is assigned, and information about a life of the logical block, as shown in FIG. 3B. Thus, as information about the life, an erasing count, etc. of a logical block may be displayed, for example.

The block list 1423 for compaction is the information which shows the logical block which has valid data and invalid data which is a candidate of a compaction, and as shown in FIG. 3C, it includes a logical block number for compaction, and the number of effective clusters contained in the logical block. This block list 1423 for compaction is placed in order according to the number of effective clusters, for example.

The free block list 1424 is a table which manages the current use unallocated free blocks in logical block unit, and as shown in FIG. 3D, is constituted by the logical block number without an effective cluster. Here, the logical block number is arranged in order of smaller erase count. If there is a demand for assignment of a free block, the logical block having a logical block number with smallest erase count will be assigned.

In this embodiment, when change arises in a data recording position by the writing of the data to the NAND memory 12, erasing of the data within the NAND memory 12, etc., the management information on RAM 14 is updated each time, and the change difference after the management information stored in the NAND memory 12 is stored as a log. By this, the management information can be restored even for sudden power interruption. Moreover, the management information stored in RAM 14 is stored in the NAND memory 12 at the predetermined time when the power supply of the memory system 10 is turned off, for example.

The control unit 15 performs a data-transfer-control processing between the host device and the NAND memory 12, a data management processing within the NAND memory 12, etc. Here, the component required to perform the compaction processing is shown. The control unit 15 includes a log information record positioning unit 151, a log information generation unit 152, a data processing unit 153, a management information managing unit 154, a determination unit of data for compaction 155, and a block management unit 156.

The log information record positioning unit 151 determines the writing position of the log information at the time of data writing in the NAND memory 12. In addition, in this embodiment, the log information which provides a summary of the log of the cluster unit in one logical page is recorded in the cluster that is the last writing position of that logical page. The position (henceforth referred to as a log information recording position) of a cluster where this log information is recorded is changed for each logical page within one logical block in accordance with a predetermined rule. This is for reading the log information of a different logical page at once by the determination unit of data for compaction 155 as described later. The method of changing the log information recording position for each logical page of this is described later.

The log information generation unit 152 generates the log information which shows the correspondence relation between the logic cluster address at the time of writing data in the NAND memory 12 according to the writing position of log information determined by the log information record positioning unit 151, that is, the writing start position of data and a data recording position cluster unit. This log information also shows the contents of change of the data recording position management table 1421.

FIGS. 4A and 4B are figures showing an example of the data recording position management table and the log information. FIG. 4A shows the situation before writing data and FIG. 4B shows the situation after writing data. As shown in FIG. 4A, the logic cluster address is in the state where the data of "2034" is written in the data recording position (logical-block number: logic cluster number) "119:800." This information is also reflected in the data recording position management table 1421. In addition, log information includes the logic cluster address and the data recording position (logical block number: logic cluster number) as well as the entry of the data recording position management table 1421.

Then, if rewriting of the data of a logic cluster address "2034" occurs and data is written in a new data recording position "358:3", as shown in FIG. 4B, the log whose data recording position is "358:3" in the logic cluster address "2034" will be generated. As will be described in detail later, since there is no data recorded on the data recording position of the old log in the newest data recording position management table 1421, it becomes invalid data.

The data processing unit 153 generates commands, such as the writing processing, reading processing, compaction processing, and processes reading of data to the NAND memory 12, writing of data from NAND memory 12, compaction, etc. based on the generated command. In the case of the writing data, the writing data and log information corresponding to its writing data is written in the logical block and logical page which are determined based on the log information recording position determined in the log information record positioning unit 151.

Moreover, when the data processing unit 153 performs the compaction processing, the logical block used for compaction is determined from the block list 1423 for compaction, the reading processing is performed and the read log information is passed to the determination unit of data for compaction 155 so that log information may be read from each logical page of this logical block in parallel. Moreover, the data for compaction is read from the data recording position acquired from the determination unit of data for compaction 155 to the buffer 1413. The data in the compaction buffer 1413 and the log information generated in the log information generation unit 152 are written in the logical page of the logical block based on the log information recording position determined in the log information record positioning 151.

The management information managing unit 154 manages so that the management information which changes with the writing of the data to the NAND memory 12, etc. may become the newest information. For example, when the data recording position corresponding to the logic cluster address of data is changed by the writing of the data to the NAND memory 12, the data recording position management table 1421 is updated in a new data recording position, or when a logical block is erased, the erasing count of the logical-to-physical conversion translation table 1422 is updated. Moreover, when the number of the effective clusters of the logical block for the compaction processing changes, the number of effective clusters of the block list 1423 for compaction is updated, or when the number of effective clusters of the logical block for the compaction processing is set to 0, the logical block is added to the free block list.

The determination unit of data for compaction 155 acquires the data recording position of the valid data (effective cluster) which becomes data for compaction, from the log information of each logical page of the logical block corresponding to the logical block number acquired from the data-processing unit 153. Specifically one log is acquired from log information, the data recording position corresponding to the logic cluster address of this log is acquired from the data recording position management table 1421, and the two are compared. When the two match with each other, the data stored by the logic cluster address is valid data, and becomes data for compaction. On the other hand, when the two do not match with each other, the data recording position in a log is old data and the data stored by the logic cluster address is invalid data and the data stored by the logic cluster address does not become data for compaction and the logic cluster address of the data for compaction is passed to the data processing unit 153.

The block management unit 156 manages the block which performs the writing in the NAND memory 12. For example, by the compaction processing, the block for compaction whose valid data is lost is released, and it is made into a free block. Moreover, it also has a function which selects the block to write to in the case of writing processing or compaction processing so that the block which constitutes the NAND memory 12 may be used equally on the whole.

Now, the determination method of the recording position of the log information by the log information record positioning 151 will be explained. After first explaining the case in which it writes in a logical page, by the usual writing method, the case which carries out channel distribution of the log information record position and furthermore the case which carries out bank distribution are explained.

When the data written in a logical page is complete and log information is finally completed, determining a log information recording position is equivalent to determining the start position of data. If the data start position is made into the same position in any logical page, the log information recording position will also turn into the same position in any logical page. Usually, log information will be recorded in the final cluster since the data is written (arranged) in the unit of cluster so as to cross the parallel operation elements from the first cluster of a logical page. Therefore, in the case of determination processing of the data for compaction, in order to read the log information stored in the last cluster, one logical page will be read at a time. For example, as shown in FIG. 2, when the log information of all the logical pages which constitute a logical block is written in the cluster of the position where the logic cluster number is equivalent to "63", the reading processing for 64 pages will be repeated.

Figure 5:
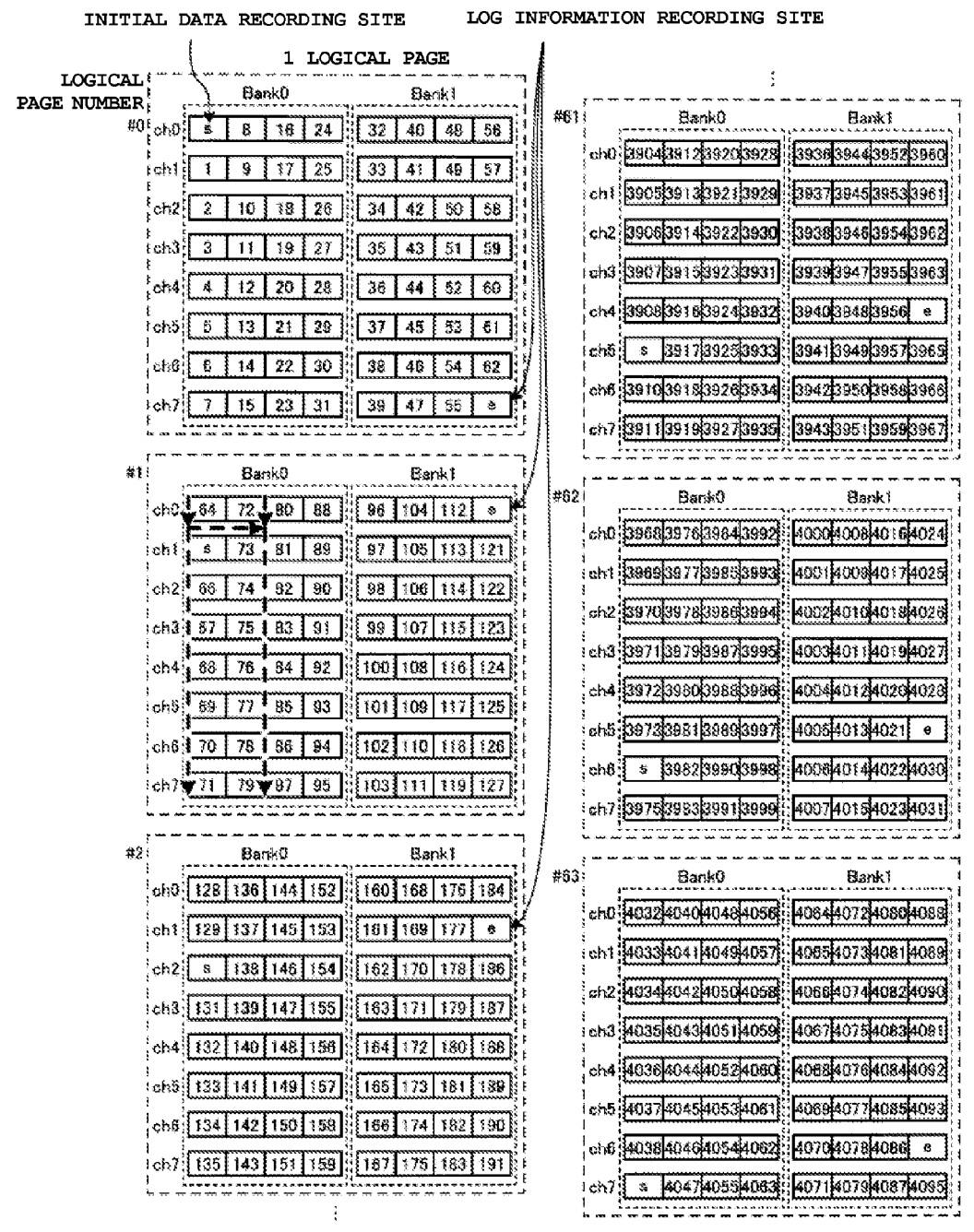

FIG. 5 shows an example in the case of distributing the log information recording positions across different channels. As shown in FIG. 1, the memory system 10 has eight channels which are connected to the eight parallel operation elements 121-0 to 121-7 and can read one physical page from the eight parallel operation elements 121-0 to 121-7 independently (in parallel), respectively. Then, as shown in FIG. 5, a cycle of the record start position "s" of data which is considered as the channel 0 in the logical page number 0, considered as the channel 1 in the logical page number 1, and considered as the channel 2 in the logical page number 2, etc., and considered as the channel 7 in the logical page number 7, (that is, the record position "e" of log information is considered as the channel 7 in the logical page number 0, considered as the channel 0 in the logical page number 1, and considered as the channel 1 in the logical page number 2, etc., and considered as the channel 6 in the logical page number 7) will be repeated. If it is further generalized, the data start channel (parallel operation element) of the logical page number n (n is an integer greater than or equal to 0) in the memory system 10 of channel number m (the number of parallel operation elements) (m is a natural number) will be determined according to the following formula (1).

$$\text{Data start channel} = n \bmod m \quad (1)$$

That is, in the case of the configuration of FIG. 1, the log information is written in the parallel operation element 121-7 from the channel 7 when the logical page number is 8i (i is an integer greater than or equal to 0), log information is written in the parallel operation element 121-0 from the channel 0 when the logical page number is 8i+1, log information is written in the parallel operation element 121-1 from the channel 1 when the logical page number is 8i+2, ... and log information will be written in the parallel operation element 121-6 from the channel 6 when the logical page number is 8i+7, and the channel in which log information is recorded will change periodically.

In addition, the method of connecting the data when viewed in the cluster size in the logical page 0 is the order of 0→1→2→ ... →7→8→9→ ... →63 by the logical cluster number. Moreover, the method of connecting the data when viewed in the cluster size in the logical page 1 is the order of 65→66→ ... →71→64→73→74→ ... →79→72→ 81→ ... →127→1200 by the logical cluster number. Although the writing start positions of other logical pages differ, the method of connecting the data is the same. Moreover, in these cases, after writing the parallel operation element 121-0 to 121-7 of Bank0, the writing of the parallel operation element 121-0 to 121-7 of Bank1 is performed. In addition, in order to explain plainly, the number in the logical page 0 is used for the order of data. In fact, the number will be added to (number of a logical page)×64.

In this way, it becomes possible to read the data of the range including the log information of a logical page which is different in each channel 0-7 in the case of determination processing of the data for compaction by changing the writing start position (channel) of the data for writing. Specifically, it becomes possible to read the log information for eight logical pages simultaneously by reading the logical page 0 the channel 7, reading the logical page 1 in the channel 0, reading the logical page 2 in the channel 1 ... and reading the logical page 7 in the channel 6.

Figure 6A:
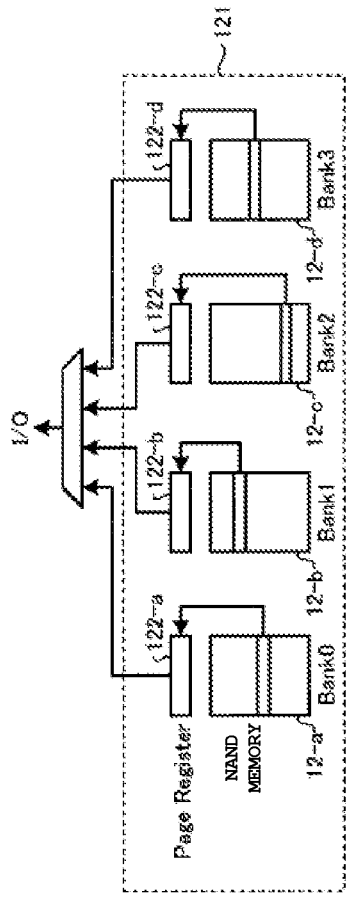
Figure 6B:
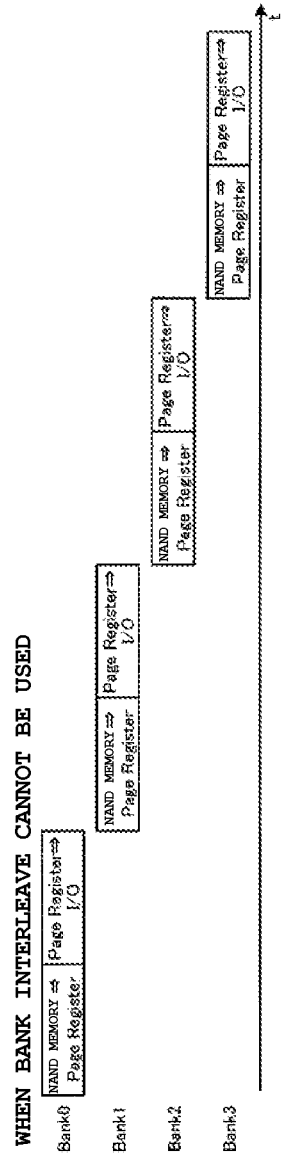

FIGS. 6A to 6C are diagrams explaining a structure of bank interleaving. FIG. 6A is a diagram schematically showing a configuration of a NAND memory. FIG. 6B is a diagram showing an example of a time chart at the time of reading data in the case of not using bank interleaving. FIG. 6C is a diagram showing an example of a time chart at the time of reading data in the case of using the bank interleaving.

Here, as shown in FIG. 6A, the case where the parallel operation element 121 of the NAND memory 12 includes four banks (Bank0 to Bank3) is mentioned as the example so that it may be easy to understand the effect of bank interleaving visually. Each Bank0 to Bank3 is provided with NAND memory 12-a to 12-d and page register 122-a to 122-d which temporarily stores the data read from NAND memory 12-a to 12-d.

When not using the bank interleaving, as shown in FIG. 6B, if a reading command is received, data will first be read from the address in the NAND memory 12-a of Bank0 specified by a reading command to the page register 122-a, and read data will be transmitted to an actual I/O from the page register 122-a. Then, the data is read from the address in the NAND memory 12-b of Bank1 specified by the reading command to the page register 122-b, and the read data is transmitted to the actual I/O from the page register 122-b. Then, the data is read from the address in the NAND memory 12-c of Bank2 specified by the reading command to the page register 122-c, and the read data is transmitted to the actual I/O from the page register 122-c and then the data is read from the address in the NAND memory 12-d of Bank3 specified by a reading command to the page register 122-d, and the read data is transmitted to the actual I/O from the page register 122-d. Thus, two-step processing of read from the NAND memory 122-a to 122-d to the page register 122-a to 122-d, and transmitting data from the page register 122-a to 122-d to the I/O are performed in each Bank0 to 3.

On the other hand, when using the bank interleaving, as shown in FIG. 6C, while performing the processing which transmits data from the page register 122 to the I/O in a certain bank, the processing of simultaneously reading from the NAND memory 12 to the page register 122 in the following bank shall be performed. For example, while read data is transmitted from the page register 122-a to the actual I/O in Bank0, the data is simultaneously read from the address in the NAND memory 12-b of Bank1 specified by a reading command to the page register 122-b. Moreover, while the read data is transmitted from the page register 122-b to actual I/O in Bank1, the data is simultaneously read from address in the NAND memory 12-c of Bank2 specified by a reading command to page register 122-c. Thus, it becomes possible to read the data of a plurality of banks in the same channel (parallel operation element) at high speed by overlap processing two different banks. In addition, although the case of reading data is mentioned as the example and is explained here, the case of writing data may also be the same.

Figure 7:
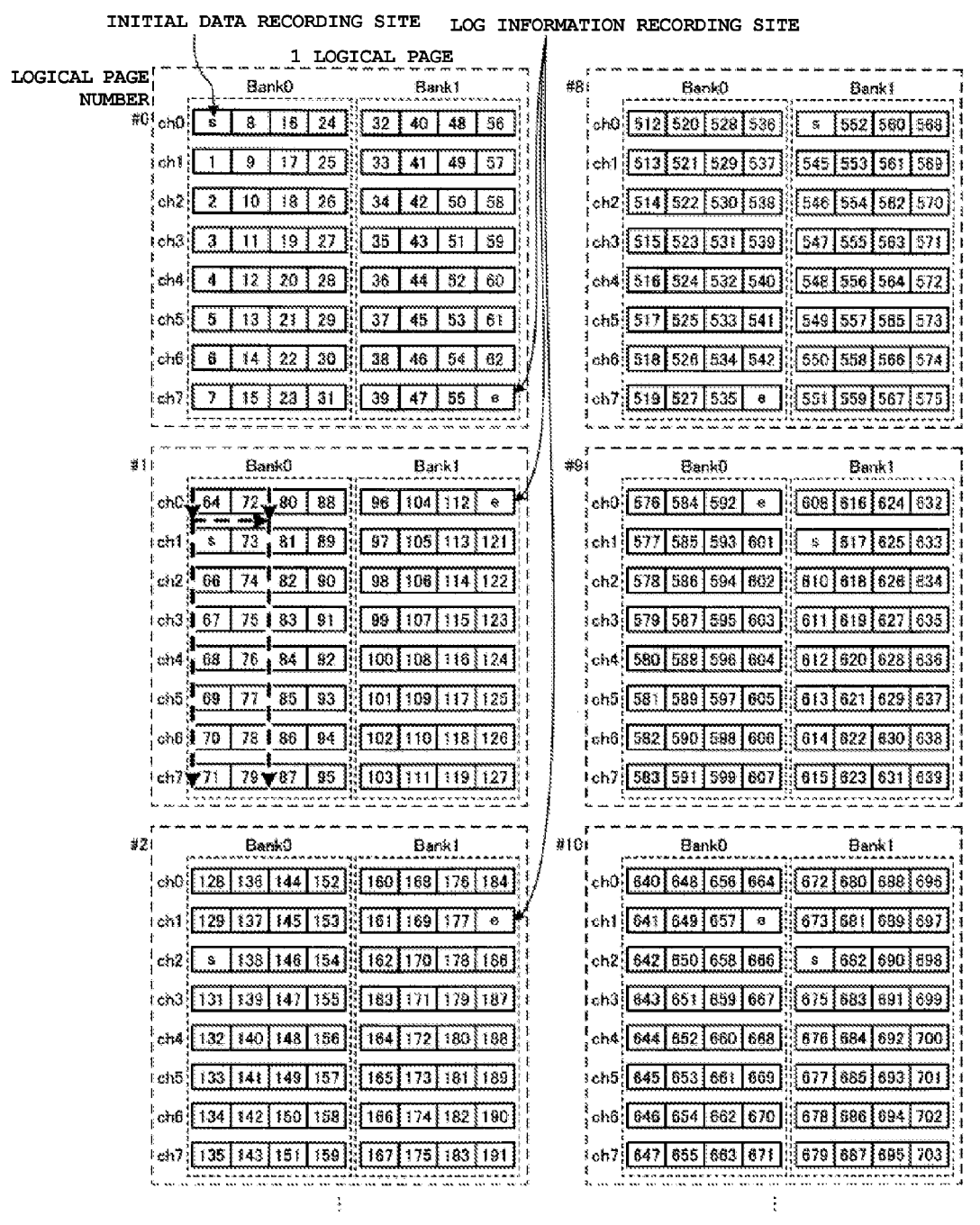

FIG. 7 is a diagram showing an example of distributing log information recording positions across different channels and different banks. As shown in FIG. 7, specifically, the cycle of the recording start position "s" of data which is considered as Bank 0 of the channel 0 in the logical page number 0, considered as Bank0 of the channel 1 in the logical page number 1, considered as Bank0 of the channel 2 in the logical page number 2, and ..., considered as Bank0 of the channel 7 in the logical page number 7, considered as Bank1 of the channel 0 in the logical page number 8, considered as Bank1 of the channel 1 in the logical page number 9, considered as Bank1 of the channel 2 in the logical page number 10, ... considered as Bank1 of the channel 7 in the logical page number 15 (Namely, the recording position "e" of log information is considered as Bank1 of the channel 7 in the logical page number 0, considered as Bank1 of the channel 0 in the logical page number 1, considered as Bank1 of the channel 1 in the logical page number 2, ... considered as Bank1 of the channel 6 in the logical page number 7, considered as Bank0 of the channel 0 in the logical page number 8, considered as Bank0 of the channel 1 in the logical page number 9, considered as Bank0 of the channel 2 in the logical page number 10, ... and considered as Bank1 of the channel 0 in the logical page number 15) will be repeated. If it is further generalized, the data start channel (parallel operation element) and the data start bank of logical page number n in the memory system 10 of the channel number m (the number of parallel action elements) and the bank number s (s is a natural number) will be determined by the following formula (2) and (3), respectively.

$$\text{Data start channel} = n \text{ modulo } m \quad (2)$$

$$\text{Data start } bank = n/m \text{ modulo } s \quad (3)$$

However, "n/m" in formula (3) represents the quotient. That is, it represents the quotient when the logical page number n is divided by the channel number m.

That is, in the case of the configuration of FIG. 1, when the logical page number is 16i, log information is written in Bank1 of the channel 7, when the logical page number is 16i+1, log information is written in Bank1 of the channel 0, when the logical page number is 16i+2, log information is written in Bank1 of the channel 1, ... and when the logical page number is 16i+7, log information is written in Bank1 of the channel 6, when the logical page number is 16i+8, log information is written in Bank0 of the channel 7, when the logical page number is 16i+9, log information is written in Bank0 of the channel 0, when the logical page number is 16i+10, log information is written in Bank0 of the channel 1, ... and when the logical page number are 16i+15, log information is written in Bank0 of the channel 6. That is, while the channel in which log information is recorded changes periodically, the bank where log information is recorded will also change periodically.

By operating in this way, in the case of the determination processing of the data for compaction, in the channel 0-7, while outputting to the I/O the data of Bank1 of a different logical page in which log information is recorded, it becomes possible to make reading of log information quicker as compared with the case of FIG. 5 by reading the data of Bank0 of a different logical page in which log information is recorded.

Below, the writing processing in this memory system 10, reading processing, and compaction processing are explained.

<Writing Processing>

Figure 8:
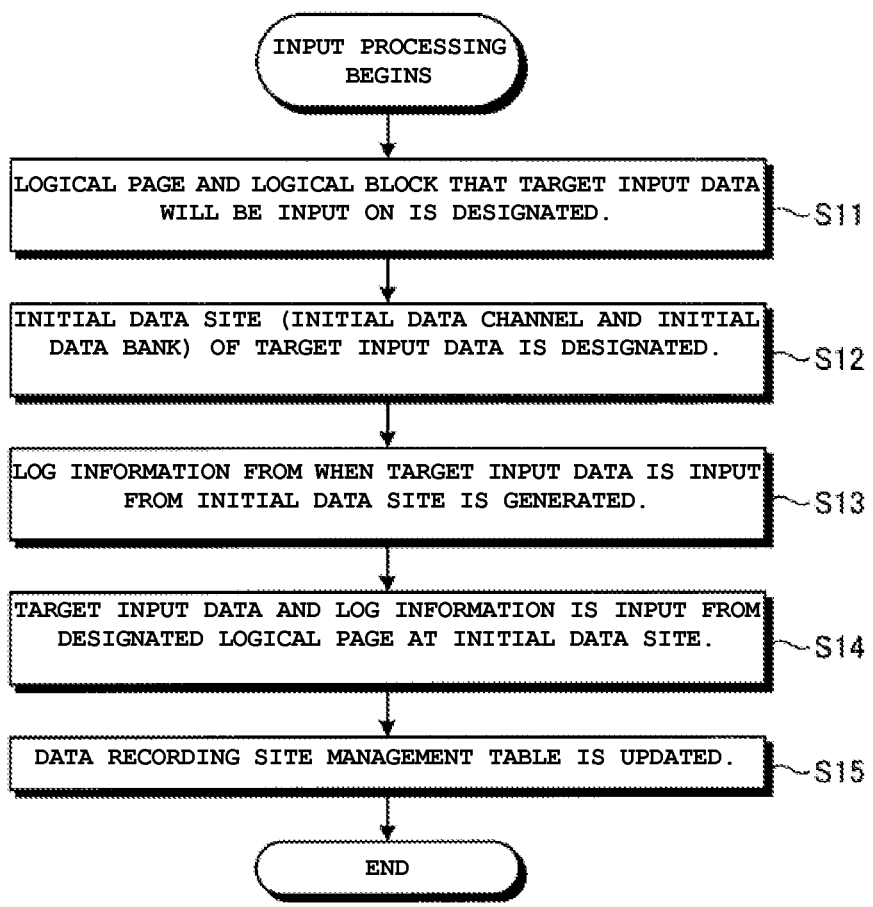
FIG. 8 is a flowchart showing a writing process according to an embodiment.

FIG. 8 is a flow chart which shows an example of writing processing. If the writing request of data is received from the host device, the data processing unit 153 will determine the logical block in the NAND memory 12 which writes the data for writing, and the logical page which performs the writing in the logical block (Step S11). Then, the log information record positioning unit 151 determines the data start position of the data for writing, i.e., the data start channel, and the data start bank using above-mentioned (2) types and (3) types based on the logical page number which performs the determined writing (Step S12). As a result, the log information recording position is also determined.

Then, the log information generation unit 152 generates the data recording position at the time of writing data for writing from the data start position determined at Step S12, and the log information which shows a relation with the logic cluster address assigned to the data for writing (Step S13). This log information puts together the log for all the cluster data in a logical page.

In the case of data which is newly ordered to write, the data recording position at the time of writing data for writing from the data start position determined at Step S12, is matched with the logic cluster address assigned to the data for writing. Moreover, in rewriting of the data read from the NAND memory 12, the new data recording position of the rewritten data for writing is matched with the logic cluster address of the read data.

Then, the data processing unit 153 generates the writing command written from the data writing start position which had data for writing, and the log information corresponding to it determined, and writes the data for writing, and log information in the NAND memory 12 (Step S14). At this time, one data is written in the parallel operation element 121-0 to 121-7 in parallel through eight channels. Moreover, the management information managing unit 154 updates the data recording position management table 1421 in the data recording position which changed with writing (Step S15). Writing processing is completed by the above.

<Reading Processing>

In the reading processing, if the reading request of data is received from the host device, the data processing unit 153 acquires the data recording position corresponding to the logic cluster address of data for reading from the data recording position management table 1421 and the data processing unit 153 generates a command and reads data from the NAND memory 12 so as to read data from the acquired data recording position. Since data is written in the NAND memory 12 ranging over the parallel operation element 121-0 to 121-7 as shown in FIG. 2 etc., data is simultaneously read from the eight parallel operation elements 121-0 to 121-7, and is stored to the reading buffer 1411 and then data is passed to the host device from the reading buffer 1411. The reading processing is completed by the above.

<Compaction Processing>

Figure 9:
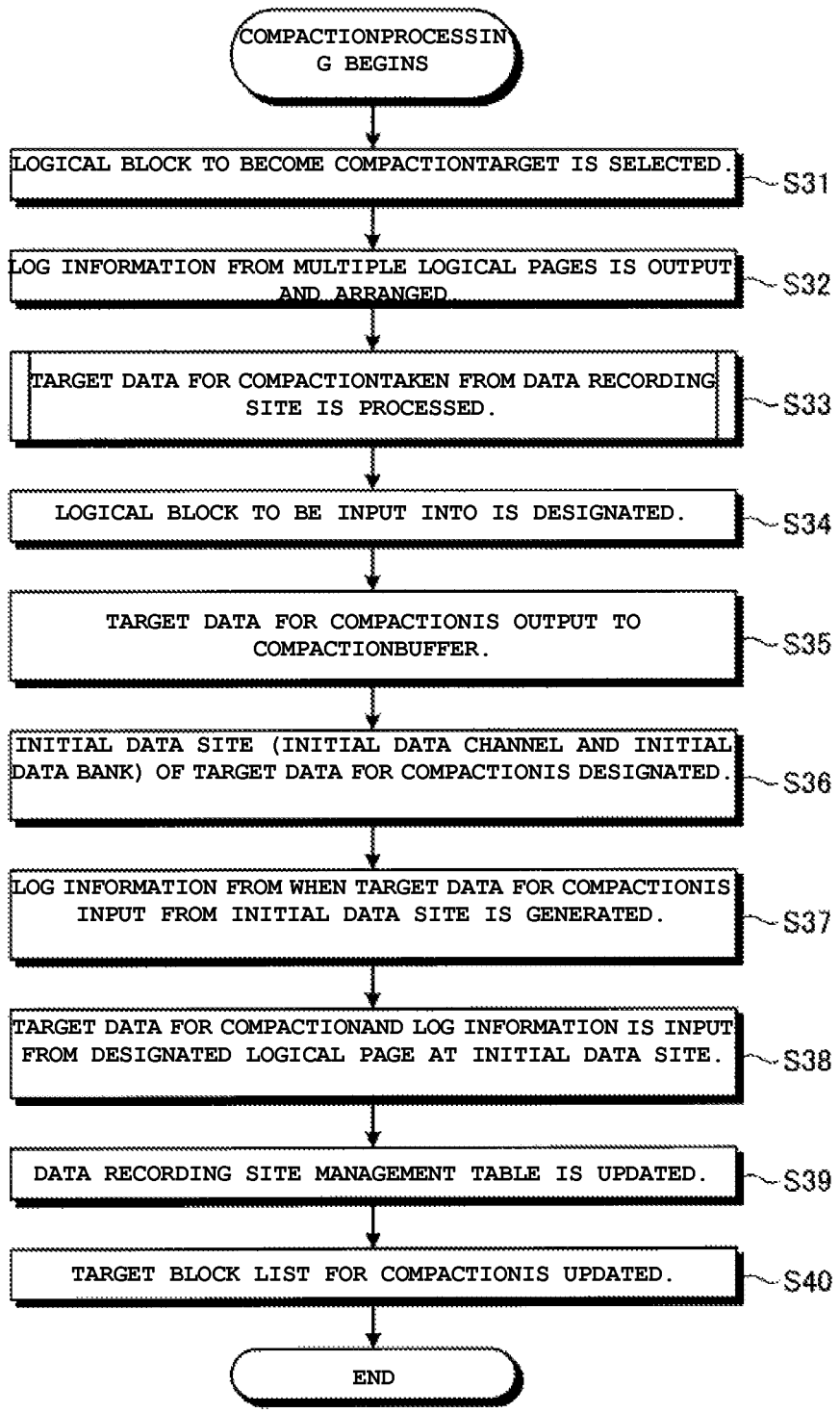
FIG. 9 is a flowchart showing a compaction processing according to an embodiment.

FIG. 9 is a flow chart which shows an example of the procedure of compaction processing. First, if the compaction processing is started, the block management unit 156 will acquire one logical block for compaction from the block list 1423 for compaction (Step S31). Generally, the logical block with few effective clusters in block list 1423 for compaction is chosen as a logical block for compaction.

Then, the data processing unit 153 generates the command which reads all the log information currently recorded on each logical page in one selected logical block, and based on the command, log information is read in parallel from multiple logical pages of the logical block chosen by the NAND memory 12 (Step S32). Since the log information recording position will become the different parallel operation element 121-0 to 121-7 (channel ch0 to ch7) for every logical page at the time of the writing to the NAND memory 12 of data as explained above, data including the log information recording position for eight logical pages is read simultaneously. For example, in the case of FIG. 7, in the channel ch0 to ch6, the log information written in the logical pages 1 to 7 of Bank1 is read respectively, and in the channel ch7, the log information written in the logical page 0 of Bank1 is read, and these read data are stored in the reading buffer 1411. Moreover, while performing the processing which stores the read data to the buffer 1411 by bank interleaving, the processing which reads the following data from the NAND memory 12 is performed simultaneously. Here, the log information written in the logical page 9 to 16 of Bank0, is read in channel ch0 to ch6 respectively, and the log information written in the logical page 8 of Bank0 is read in channel ch7. Such processing is repeated performed.

The determination unit of data for compaction 155 performs acquisition processing of the data recording position of the data for compaction using the log information in the read data to the reading buffer 1411, and the data recording position management table 1421 (Step S33).

Figure 10:
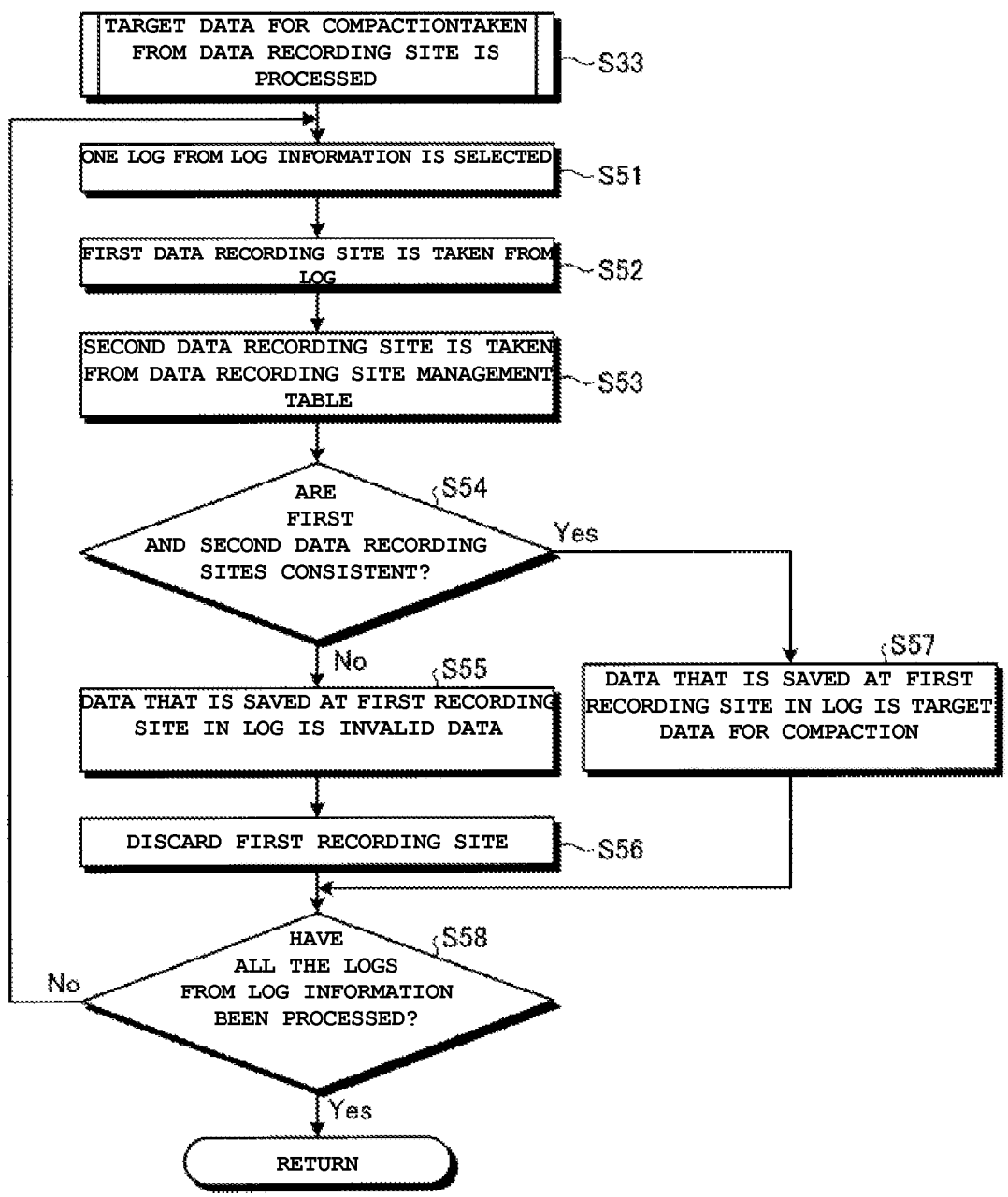
FIG. 10 is a flow chart which shows a method of acquiring data recording positions of the data for compaction, according to an embodiment.
Figure 11:
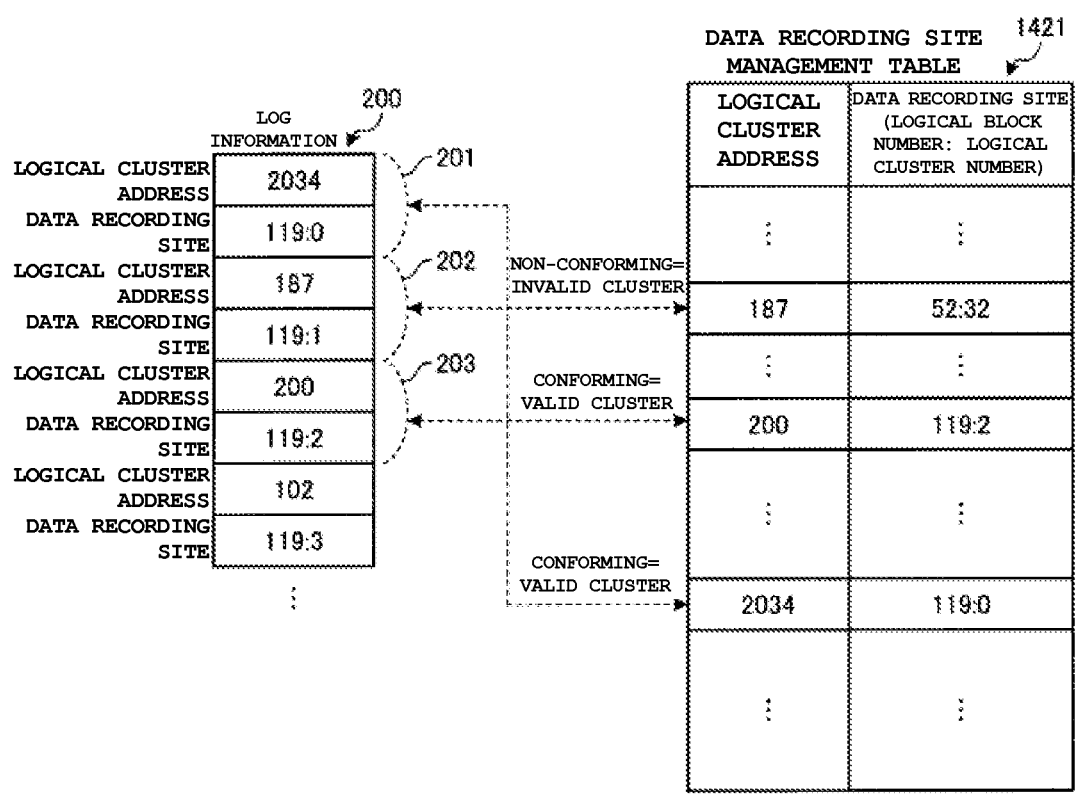
FIG. 11 is a diagram schematically showing an example of a process for determining the data for compaction.

FIG. 10 is a flow chart which shows an example of the procedure of acquisition processing of the data recording position of the data for compaction, and FIG. 11 is a figure schematically showing an example of typical determination processing of the data for compaction. The determination unit of data for compaction 155 chooses one log in log information (Step S51), and acquires the data recording position (it is hereafter considered as the first data recording position) corresponding to the logic cluster address (Step S52). Moreover, the determination unit of data for compaction 155 acquires the data recording position (it is hereafter considered as the second data recording position) corresponding to the logic cluster address of the log chosen from the data recording position management table 1421 (Step S53) and it is determined whether the first data recording position and the second data recording position match with each other (Step S54).

When the first data recording position does not match with the second data recording position (in the case of No in step S54), the first data recording position in a log is determined to be the old and invalid data, since the contents of the data recording position management table 1421 are the newest (correct). That is, it is determined that the data stored in the acquired logic cluster address is not the data for compaction (Step S55) and the first data recording position acquired at Step S52 is cancelled (Step S56).

For example, in the log 202 in the log information 200 of FIG. 11, the logic cluster address is "187" and the first data recording position is "119:1." On the other hand, in the data recording position management table 1421, the second data recording position corresponding to a logic cluster address "187" is "52:32." That is, the first data recording position and the second data recording position are mismatched, and the first data recording positions stored in the log 202 are old contents. As a result, the data currently recorded on the first data recording position is an invalid cluster (data).

On the other hand, when the first data recording position and the second data recording position match with each other (in the case of Yes in Step S54), it is determined that the first data recording position in a log is the newest item and valid data. That is, it is determined that the data stored in the acquired logic cluster address is the data for compaction (Step S57).

For example, in the log 201 in the log information 200 of FIG. 11, the logic cluster address is "2034" and the first data recording position is "119:0." Moreover, in the data recording position management table 1421, the second data recording position corresponding to a logic cluster address "2034" is "119:0." That is, the first data recording position and the second data recording position match with each other, and the first data recording position which is stored in the log 202 represents the newest contents. As a result, the data currently recorded on the first data recording position is an effective cluster (data), and, therefore it is also data for compaction. The same is true of the log 203 and it is data for compaction.

It is checked after Step S55 or Step S57 whether the processing is performed for all the logs in log information (Step S58). When it is not performed for all logs (in the case of No in step S58), the method returns to Step S51 and the processing which is described above is performed repeatedly. Moreover, when processing is performed for all the logs (in the case of Yes in Step S58), the acquisition processing of the data for a compaction is completed and the method returns to the processing of the flowchart of FIG. 9.

Returning to FIG. 9, the data processing unit 153 determines the logical block which writes the data for compaction (Step S34). Then, the data processing unit 153 generates the command which reads the data for compaction of the data recording position acquired by the determination unit of data for compaction 155 to the compaction buffer 1413, and the data for compaction is stored to the compaction buffer 1413 (Step S35) in accordance with the command.

Then, the log information record positioning unit 151 determines the writing start position at the time of writing the data stored by the compaction buffer 1413 in a logical page with the logical block to write (Step S36). Here, the data start channel and a data start bank are determined using the formulas (2) and (3) mentioned above.

Then, the log information generation unit 152 generates the contents of the data recording position management table 1421 which are changed at the time of writing the read data to the compaction buffer 1413 from the writing start position of the logical page determined at Step S36 as a log in cluster unit, and generates the log information summarized in the logical page unit (Step S37).

Then, the data processing unit 153 generates the command which directs writing the data which is stored in the compaction buffer 1413 and generated log information from the writing start position of a logical page, and writes the data in the compaction buffer 1413 to the logical block according to the generated command (Step S38). Moreover, the management information managing unit 154 reflects in the data recording position management table 1421 the change (the same information as the log generated at Step S37) of the data recording position which is produced by the writing the data for compaction to the logical block to write (Step S39).

Then, the management information managing unit 154 reflects in the block list 1423 for compaction change of the number of effective clusters in block for compaction as a result of having performed compaction processing (Step S40). Specifically, it is determined whether the number of effective clusters under block for a compaction is 0 by the compaction processing. When the number of effective clusters is not 0, the number of effective clusters after the compaction processing is reflected in the block list 1423 for compaction. On the other hand, when the number of effective clusters is 0, the block management unit 156 releases the logical block whose effective cluster is lost, and causes it to become a free block, and the management information managing unit 154 adds the logical block which is made into free block to the free block list 1424. The compaction processing is completed by the above.

In addition, by the explanation, when writing data in the logical block while channel distribution of the position of log information is carried out, the case where bank distribution is carried out is shown, but only channel distribution may be carried out.

In this embodiment, the new data recording position for the logic cluster address of the data which is changed by data writing when the writing data is made into a log, the log information which is summarized for each cluster in the logical page is recorded in the logical page unit and the writing position of the log information is made to carry out channel distribution. Although the effective cluster at the time of performing the compaction processing using this log information is searched while reading simultaneously the physical page on which the log information is recorded in each channel on that occasion, the valid data in a logical block is determined by match/mismatch of the contents of the of the log, and the contents of data recording position management table 1421. Thus, the log information prepared in each logical page in a logical block can be read by a number of channels, and it has the effect that the time required to read the log information can be shortened as compared with the case where it reads one logical page at a time. Furthermore, it becomes possible to carry out bank distribution of the writing position of log information, and further to shorten the time required to read the log information by using a bank interleaving function.

Moreover, to show the position of the valid data in a logical block, since the log information is recorded on each logical page, it is not necessary to keep the effective data map which shows the position of valid data separately in the management information, and to prepare the exclusive memory area. Therefore, the cost of the device can be decreased. Furthermore, by arranging log information efficiently, the log information read at the time of the search for data for compaction can be accelerated, and it also has the effect that the exclusive p memory for an effective data map, can be reduced compared with the conventional one without spoiling compaction processing performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
 a first storage unit having first and second parallel operation elements and non-volatile data recording areas divided into a plurality of logical pages including first and second logical pages, each logical page including a plurality of the recording areas;
 a second storage unit capable of temporarily storing data before the data is stored in the non-volatile data recording areas of the first storage unit; and
 a control unit configured to perform data transfer between the first storage unit and the second storage unit in units of logical pages, generate log information for the recording areas of each logical page for which data transfer is being performed, and control the first parallel operation element to write the log information generated for the recording areas of the first logical page into a log information recording area of the first logical page and the second parallel operation element to write the log information generated for the recording areas of the second logical page into a log information recording area of the second logical page, wherein
 the first logical page includes a first recording area for which write processing is carried out by the first parallel operation element and a second recording area for which write processing is carried out by the second parallel operation element, and
 the second logical page includes a third recording area for which write processing is carried out by the first parallel operation element and a fourth recording area for which write processing is carried out by the second parallel operation element.

2. The memory system of claim 1, wherein a write processing of each recording area is executed by one of the parallel operation elements.

3. The memory system of claim 1, wherein the log information generated for the recording areas of the logical pages indicates logical addresses of the units of data being stored in the recording areas.

4. The memory system of claim 3, wherein the control unit is further configured to read the log information generated for the recording areas of the first logical page from the log information recording area of the first logical page using the first parallel operation element and read the log information generated for the recording areas of the second logical page from the log information recording area of the second logical page using the second parallel operation element.

5. The memory system of claim 1, wherein each of the parallel operation elements has multiple banks, and write processing of log information recording areas of two different logical pages is executed by the same parallel operation element but different banks.

6. A control method of a memory system having a storage unit having first and second parallel read/write processing elements and non-volatile data recording areas divided into a plurality of logical pages including first and second logical pages, each logical page including a plurality of the recording areas, the method comprising:
 generating log information for the recording areas of each logical page for which data transfer is being performed by the read/write processing elements;
 controlling the first parallel read/write processing element to write the log information generated for the recording areas of the first logical page into a log information recording area of the first logical page; and
 controlling the second parallel read/write processing element to write the log information generated for the recording areas of the second logical page into a log information recording area of the second logical page, wherein
 the first logical page includes a first recording area for which write processing is carried out by the first parallel operation element and a second recording area for which write processing is carried out by the second parallel operation element, and
 the second logical page includes a third recording area for which write processing is carried out by the first parallel operation element and a fourth recording area for which write processing is carried out by the second parallel operation element.

7. The control method of claim 6, wherein each of the parallel read/write processing elements has multiple banks, and write processing of log information recording areas of two different logical pages is executed by the same parallel read/write processing element but different banks.

8. The control method of claim 6, wherein the log information generated for the recording areas of the logical pages indicates logical addresses of the units of data being stored in the recording areas.

9. The control method of claim 6, further comprising:
reading the log information generated for the recording areas of the first logical page from the log information recording area of the first logical page using the first parallel read/write processing elements; and
reading the log information generated for the recording areas of the second logical page from the log information recording area of the second logical page using the second parallel read/write processing elements.

10. The memory system of claim 4, wherein the control unit is configured to maintain a management table that stores mapping information of units of data stored in the recording areas of the first storage unit and determine whether a unit of data stored in a recording area of a logical page is valid or invalid by comparing (i) the log information generated for the recording area and written into the log information recording area of the logical page, and (ii) mapping information for the unit of data stored in the management table.

11. The memory system of claim 10, wherein the control unit is configured to determine that a first unit of data stored in a first recording area of a logical page is valid when the log information generated for the first recording area and written into the log information recording area of the logical page, and mapping information for the first unit of data stored in the management table match, and a second unit of data stored in a second recording area of a logical page is invalid when the log information generated for the second recording area and written into the log information recording area of the logical page and mapping information for the second unit of data stored in the management table do not match.

12. The control method of claim 6, further comprising:
maintaining a management table that stores mapping information of units of data stored in the recording areas of the storage unit; and
determining whether a unit of data stored in a recording area of a logical page is valid or invalid by comparing (i) the log information generated for the recording area and written into the log information recording area of the logical page, and (ii) mapping information for the unit of data stored in the management table.

13. The control method of claim 12, wherein a first unit of data stored in a first recording area of a logical page is determined to be valid when the log information generated for the first recording area and written into the log information recording area of the logical page and mapping information for the first unit of data stored in the management table match, and a second unit of data stored in a second recording area of a logical page is determined to be invalid when the log information generated for the second recording area and written into the log information recording area of the logical page and mapping information for the second unit of data stored in the management table do not match.

14. A control method of a memory system including a storage unit having a first parallel processing element, a second parallel processing element, a first logical page including a first recording area and a second recording area, and a second logical page including a third recording area and a fourth recording area, the method comprising:
generating log information including first log information for the first logical page and second log information for the second logical page;
controlling the first processing element to write user data into the third recording area and the first log information into the second recording area; and
controlling the second processing element to write user data into the first recording area and the second log information into the fourth recording area.

15. The memory system of claim 1, wherein each of the parallel operation elements has a first bank and a second bank, and write processing for the log information recording area of the first logical page is carried out by the second bank of the first parallel operation element and write processing for the log information recording area of the second logical page is carried out by the first bank of the second parallel operation element.

16. The control method of claim 6, wherein each of the parallel operation elements has a first bank and a second bank, and write processing for the log information recording area of the first logical page is carried out by the second bank of the first parallel operation element and write processing for the log information recording area of the second logical page is carried out by the first bank of the second parallel operation element.

* * * * *